US010698898B2

(12) United States Patent
Khandelwal

(10) Patent No.: US 10,698,898 B2
(45) Date of Patent: Jun. 30, 2020

(54) FRONT END BLOOM FILTERS IN DISTRIBUTED DATABASES

(71) Applicant: Microsoft Technology Licensing, LLC, Redmond, WA (US)

(72) Inventor: Sunil Khandelwal, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 15/414,325

(22) Filed: Jan. 24, 2017

(65) Prior Publication Data

US 2018/0210959 A1    Jul. 26, 2018

(51) Int. Cl.
*G06F 16/2455* (2019.01)
*G06F 16/2458* (2019.01)
*G06F 16/22* (2019.01)

(52) U.S. Cl.
CPC .... *G06F 16/24552* (2019.01); *G06F 16/2255* (2019.01); *G06F 16/2471* (2019.01)

(58) Field of Classification Search
CPC ........... G06F 17/3033; G06F 17/30545; G06F 17/3048; G06F 16/2255; G06F 16/24552; G06F 16/2471
USPC ........................................................ 707/754
See application file for complete search history.

(56) References Cited

U.S. PATENT DOCUMENTS

| | | | |
|---|---|---|---|
| 9,218,382 B1 | 12/2015 | Muntes et al. | |
| 9,330,158 B1 | 5/2016 | Kiao et al. | |
| 9,443,108 B1 | 9/2016 | Roth et al. | |
| 9,928,178 B1* | 3/2018 | Solapurkar | H04L 67/2842 |
| 2012/0303597 A1 | 11/2012 | Bird et al. | |
| 2013/0132408 A1 | 5/2013 | Little | |
| 2013/0238584 A1 | 9/2013 | Hendry | |
| 2014/0222988 A1 | 8/2014 | Shlomo et al. | |
| 2014/0351273 A1 | 11/2014 | Yoon et al. | |
| 2014/0379424 A1 | 12/2014 | Shroff | |
| 2015/0150075 A1* | 5/2015 | Vahlis | G06F 21/602 726/1 |
| 2015/0169658 A1 | 6/2015 | Goo | |
| 2015/0193439 A1 | 7/2015 | Gaur et al. | |
| 2015/0242487 A1 | 8/2015 | Varakin et al. | |
| 2016/0275094 A1 | 9/2016 | Lipcon | |

OTHER PUBLICATIONS

Ren, et al., "TABLEFS: Embedding a NoSQL Database Inside the Local File System", In Publication of Carnegie Mellon University, CMU-PDL-12-103, May 2012, 10 pages.

* cited by examiner

*Primary Examiner* — Shahid A Alam
(74) *Attorney, Agent, or Firm* — Schwegman Lundberg & Woessner, P.A.

(57) ABSTRACT

Systems, methods, apparatuses, and software for distributed database systems in computing environments are provided herein. In one example, a method of operating a database system is provided that includes providing an interface to a database service that hosts at least a data store across a plurality of storage elements distributed with respect to each other, and receiving, in the interface, lookup requests to determine if first keys indicated by the lookup requests are present in the data store. The method includes processing the lookup requests with at least a bloom filter initialized with second keys associated with the data store to determine presence statuses of the first keys with respect to the data store, and indicating the presence statuses responsive to the lookup requests.

20 Claims, 4 Drawing Sheets

FRONT END BLOOM FILTERS IN DISTRIBUTED DATABASES

TECHNICAL BACKGROUND

Data storage systems can include various data structures to hold and relate data records, such as databases, tables, and other data structures. Structured query languages (SQL) can be used in relational database management systems (RDBMS) to query various data structures. Non-relational databases, such as schemaless or NoSQL-type databases, allow for various flexibility as compared to SQL-based data. NoSQL databases can store data in one or more tables and use updating processes which may not provide immediate data coherency throughout an entire database system. These NoSQL databases can be better suited for distributed storage systems, such as cloud storage systems, multi-data center systems, among other redundant and non-local data storage systems. However, when databases are spread or distributed over many different data systems or data centers, slowdowns can occur when individual data centers each locally service user requests for queries or lookups.

OVERVIEW

Systems, methods, apparatuses, and software for distributed database systems in computing environments are provided herein. In one example, a method of operating a database system is provided that includes providing an interface to a database service that hosts at least a data store across a plurality of storage elements distributed with respect to each other, and receiving, in the interface, lookup requests to determine if first keys indicated by the lookup requests are present in the data store. The method includes processing the lookup requests with at least a bloom filter initialized with second keys associated with the data store to determine presence statuses of the first keys with respect to the data store, and indicating the presence statuses responsive to the lookup requests.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
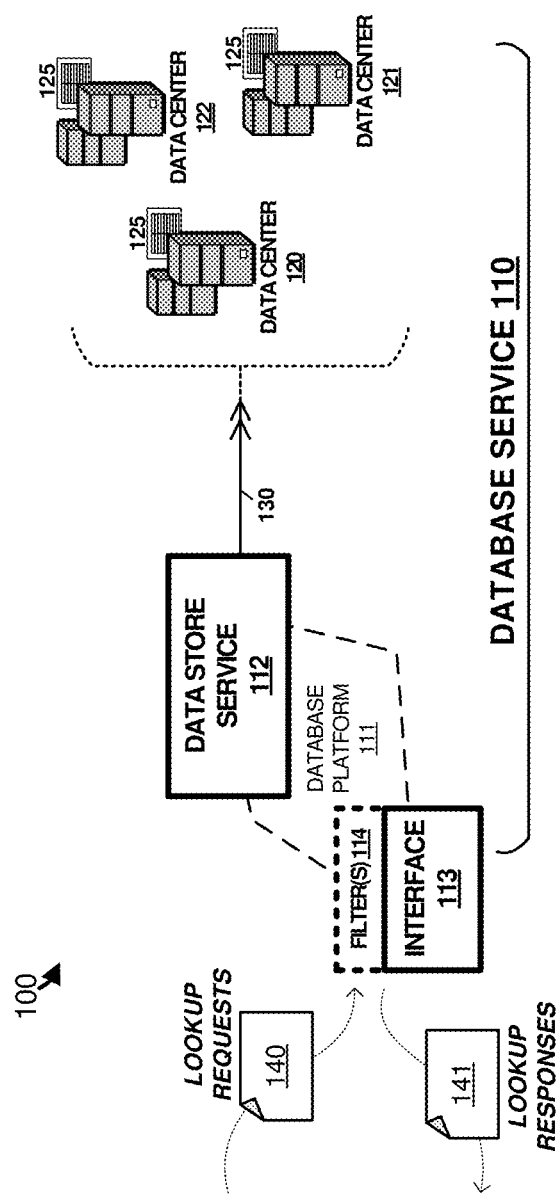
FIG. 1 illustrates a database environment in an implementation.

Non-relational databases, such as schemaless or NoSQL-type databases, allow for various flexibility as compared to SQL-based databases. Moreover, NoSQL databases can be employed over distributed computing systems, or "cloud" based database systems. NoSQL databases can store data in one or more tables and may use "eventually consistent" processes which may not provide immediate data coherency throughout an entire database system. Data sets can store data records in different configurations, such as data stored in different data partitions that are distributed over many data centers or data storage elements. When changes are made to the data records in the NoSQL databases discussed herein, such as altering existing data records, deleting data records, or adding new data records, the various data partitions can responsively be updated to reflect the changes. The update process takes time to complete, and the various views eventually become consistent with one another responsive to the changes.

NoSQL databases can include data categorized into different types, with one of the types known as key-value store. An example key-value store uses an associated array as a fundamental data model. Data is represented as key-value pairs and each possible key appears at most once in the collection. A database lookup performs a key lookup in the data store, which in many cases might involves fetching data from an associated data storage system. There is also a category of database operations that involves checking whether a particular item is present in the data store or not. The fetching of data or checking for presence of data items typically cause disk reads at the data center or storage system that hosts the associated data store or portion of the data store. Disk reads can be computationally and delay/time intensive and thus are preferably avoided if possible.

Database lookup operations can be optimized without performing disk-based operations, and in some examples, this optimization includes the use of Bloom filters. A Bloom filter (hereinafter "bloom filter") is a specialized data structure that populates a data array of indicators using a plurality of hash functions that indicate absence or potential presence of data items (such as data keys) in a data store or database. The bloom filter can be maintained in memory, such as random access memory (RAM) or other relatively fast data storage elements, and established by each data center or data storage element for data stored thereon, or established for an entire database or data store. For any requests for lookup operations, an interface to a data store or database can first pass the requests (including any associated primary/secondary keys) through the bloom filter which can return absence indicators for any entry which is not stored by the database server. This use of the boom filter can thus reduce disk usage and data searching through the actual data stores or databases responsive to key lookup operations or other operations.

As a first example of using a bloom filter in a distributed computing environment, FIG. 1 is presented. FIG. 1 illustrates database environment 100. Environment 100 includes database service 110 that further comprises database platform 111, data store service 112, interface 113. Distributed database service 110 is configured to deploy databases over a plurality of data centers, such as data centers 120-122. Typically, data centers 120-122 are distributed with respect to each other, and this distribution can include geographic distribution, physical distribution, logical distributions, or other configurations. In many examples, data centers 120-122 comprise a cloud computing platform or cloud computing service that may include one or more virtualized elements.

In operation, users or other entities can issue one or more lookup requests 140 to check for presence or absence of data entries in distributed database 125 or other distributed data stores handled by database platform 111. Data entries can be referenced by associated 'keys' which can include primary keys and secondary keys that are associated with portions of actual data included in the database. Responses 141 to lookup requests 140 can indicate if the requested keys are present in database 125 or absent from database 125. As will be discussed below, a front-end interface to the distributed database 125 includes one or more bloom filter elements 114 that enhance operation of database service 110 and associated elements.

Figure 2:
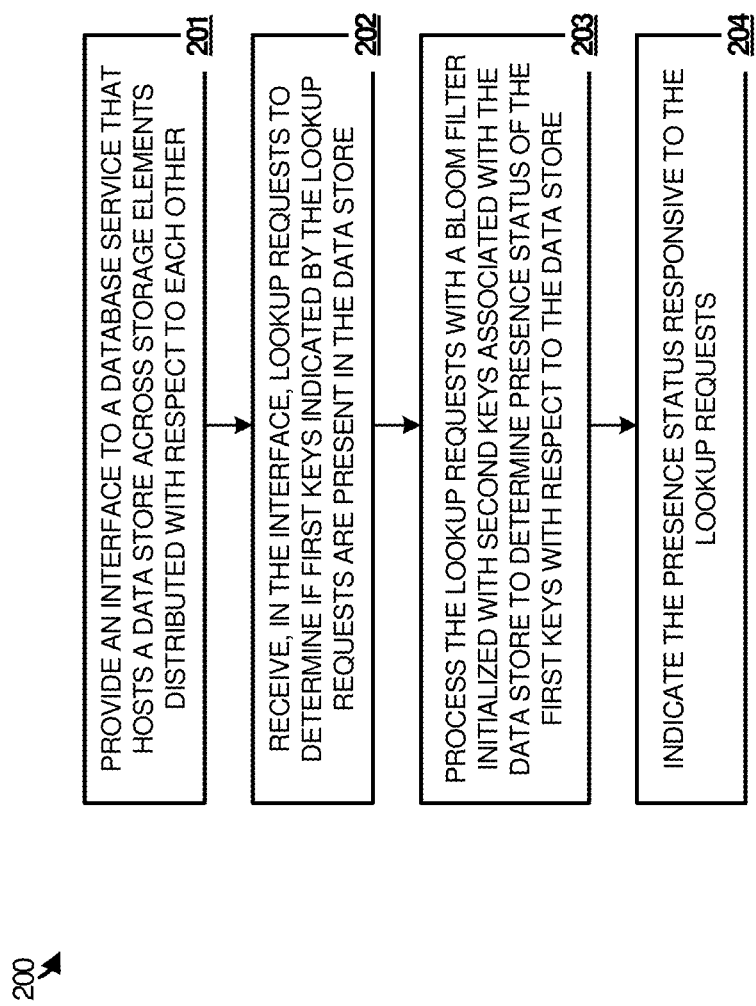
FIG. 2 illustrates a database lookup process in an implementation.

FIG. 2 is a flow diagram illustrating operations of the elements of FIG. 1. In FIG. 2, database service 110 provides (201) interface 113 to database service 110 that hosts data store 125 across storage elements 120-122 that are distributed with respect to each other. Database platform 111 can provide various modules and elements of database service 110, such as interface 113, filters 114, and data store service 112. These elements of database platform 111 can be provided on one or more computing devices, computing platforms, virtualized or non-virtualized computing systems, or other devices and systems. Elements of database service 111 communicate over one or more network links, not shown in FIG. 1 for clarity.

Interface 113 provides user-facing operations and interfaces, such as application programming interfaces (APIs), network links, packet links, sockets, ports, or other physical or logical interfaces for users to interact with elements of database service 110. In some examples, interface 113 comprises one or more function calls configured to receive user commands, user requests, or other communications in a standardized format for interacting with elements of service 110. Interface 113 provides one or more filters 114, such as bloom filters, for determining presence or absence of keys or other data elements with respect to database 125 or other databases handled by database service 110. In some examples, filters 114 can be cached or otherwise stored locally to interface 113, such as in a memory space or RAM associated with interface 113.

Data store service 112 provides for interaction with the plurality of data centers or storage elements that comprise the distributed data system of database service 110. For example, data store service 112 can communicate over network links represented by link 130 with any of data centers 120-122. Data store service 112 can receive data from data centers 120-122 related to database 125, can issue one or more queries or key lookups with respect to database 125, including any partitions thereof. In some examples, data store service 112 comprises various physical, logical, or virtualized network elements for handling of network traffic associated with data centers 120-122 with respect to database 125 or other databases and data stores.

Interface 113 receives (202) lookup requests 140 to determine if keys indicated by the lookup requests are present in the data store. In FIG. 1, lookup requests 140 are received by interface 113 for servicing by database platform 111. In some examples, lookup requests might include data store service 112 issuing one or more queries or lookup processes with respect to database 125 over associated ones of the data centers 120-122. However, issuing the one or more queries or lookup processes can impact negatively on the performance of database service 110. Not only are these requests transferred among elements of database platform 111, but then must be individually handled at the data centers, causing activity local to the data center, such as disk access, processor utilization, or other activities. Instead, in this example, interface 113 can handle lookup requests 140 in a more enhanced and efficient manner.

Specifically, interface 113 processes (203) the lookup requests with one or more bloom filters 114 initialized with keys associated with the data store to determine presence status of the keys with respect to the data store. Bloom filter 114 is initialized with keys that are already included in database 125. This initialization process can occur as data is written into database 125, or during a specific initialization process that scans database 125 to establish what keys are included. Bloom filter 114 is typically established as an array data structure that has individual array values set using one or more hashing functions applied to the keys used during the initialization process. These hashing functions are used to hash the keys into the array according to placement in the array indicated by outputs of the hashing functions.

To determine presence or absence of keys in database 125, interface 113 employs bloom filter 114 processed with any keys indicated by lookup requests 140. The keys can be check for presence without involving individual data centers or even database 125, as any associated data structures and related data that comprise bloom filter 114 can be self-contained and cached or stored locally to interface 113. In this manner, disk access or other processing local to the data centers or storage platforms that contain database 125 need not be involved in lookup processes. Faster processing of lookup requests and less disk access, power usage, communication delays, and processor utilization across database service 110 is achieved.

However, bloom filter 114 can quickly confirm absence of keys in database 125, but can only determine potential presence of the keys in database 125. To confirm presence of keys in database 125 if these keys are indicated by bloom filter 114 as potentially present in database 125, further checking or lookups can be performed. Specifically, interface 113 or data store service 112 can issue one or more lookups or queries to individual data centers that provide database 125 to confirm presence of keys once those keys are indicated by bloom filter 114 as potentially present. In some examples, potential presence is sufficient and further confirmation is not desired. In other examples, only absence of keys is determined, and further checking of confirmed presence is not performed.

Once a presence status indicating absence of the keys, or other presence status, is determined, then interface 113 indicates (204) the presence status responsive to the lookup requests. The presence statuses can be indicated in lookup responses 141, and transferred for delivery to the originally requesting entity or other destinations.

Returning to the elements of FIG. 1, elements of database platform 111 can include communication interfaces, network interfaces, processing systems, computer systems, microprocessors, storage systems, storage media, or some other processing devices or software systems, and can be distributed among multiple devices or across multiple geographic locations. Examples of elements of database platform 111 can include software such as an operating system, applications, logs, databases, utilities, drivers, networking software, and other software stored on a computer-readable medium. Elements of database platform 111 can comprise one or more platforms which are hosted by a distributed computing system or cloud-computing service. Elements of database platform 111 can comprise logical interface elements, such as software defined interfaces and Application Programming Interfaces (APIs).

Elements of database platform 111 include interface 113, filters 114, and data store service 112, among other elements.

Interface 113 can include one or more user interfaces, such as web interfaces, APIs, terminal interfaces, console interfaces, command-line shell interfaces, extensible markup language (XML) interfaces, among others. Data store service 112 comprises communication interfaces to communicate with data centers 120-122, which can include communication equipment or software that is specialized for particular ones of the data centers. In some examples, data store service 112 comprises distributed computing elements that are initiated or spawned on-demand to service data/key requests.

Data centers 120-122 can each comprise application servers, storage servers, web servers, email servers, and can be deployed over distributed or cloud computing platforms which provides data or communication services. Data centers 120-122 can store content or data for delivery to user devices, which can include database 125 or portions thereof.

Link 130, along with other links not shown among the elements of FIG. 1 for clarity, can each comprise one or more communication links, such as one or more network links comprising wireless or wired network links. The links can comprise various logical, physical, or application programming interfaces. Example communication links can use metal, glass, optical, air, space, or some other material as the transport media. The links can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. The links can be direct links or may include intermediate networks, systems, or devices, and can include a logical network link transported over multiple physical links.

Figure 3:
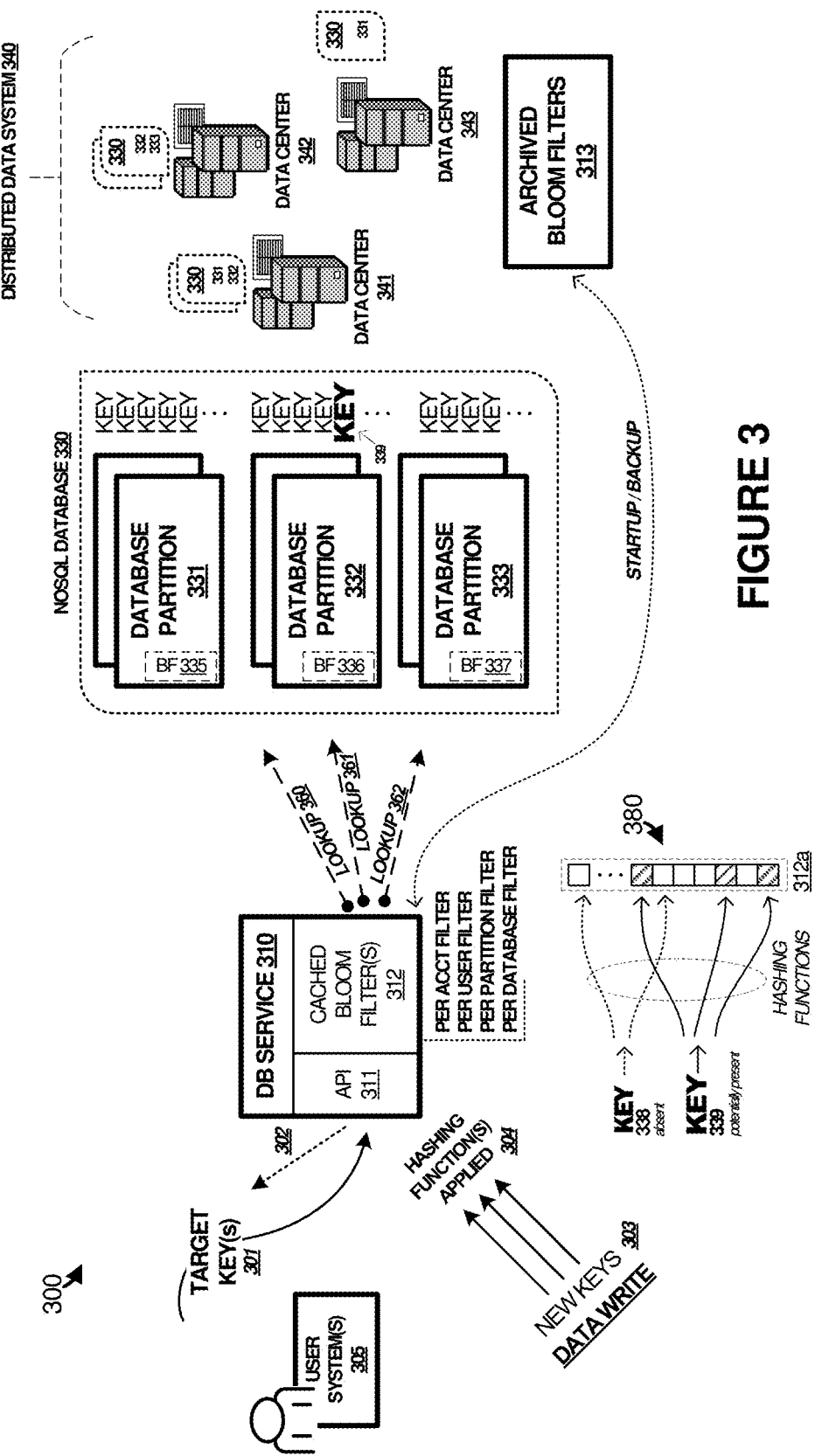
FIG. 3 illustrates a database environment and operations in an implementation.

As a further example of using bloom filters in a distributed computing environment, FIG. 3 is presented. FIG. 3 illustrates example database environment 300 and associated operations. Elements of FIG. 3 can comprise various elements of FIG. 1, although variations are possible. Environment 300 includes database (DB) service 310, NoSQL database 330, distributed data system 340, and one or more user systems 305.

The elements of FIG. 3 can communicate over one or more associated links. In some examples, these links comprise network or packet links configured to carry the communications associated with the operations discussed below. In other examples, one or more of the links can comprise logical links or programming interfaces. These links, not shown in FIG. 3 for clarity, can comprise elements as discussed above for link 130, although variations are possible.

In operation, users, administrators, operators, or automated entities associated with user systems 305 can issue one or more lookup requests to check presence statuses for data entries in distributed data stores or databases handled by database service 310. Data entries can be referenced by associated 'keys' which can include primary keys and secondary keys that are associated with portions of user data included in the database. These keys requested for presence lookup are indicated by target keys 301 in FIG. 3, and can be accompanied by associated requests and other information. Responses 302 can indicate presence statuses that indicate if the requested keys are present in database 330 or absent from database 330. As will be discussed below, a front-end interface to database 330 includes one or more bloom filter elements 312 that enhance operation of database service 310 and associated elements.

Database service 310 comprises various elements for providing database services to one or more users, operators, or other entities. These database services can include data storage within the associated database data structures, front-end interfaces, data query handling, key lookup handling, and database functionality, among other operations. API 311 is provided as an interface to external entities, such as indicated for user system 305. Cached bloom filters 312 comprise one or more bloom filter structures that are stored locally to elements of database service 310, such as with API 311 or other elements.

Initialization of cached bloom filters 312 can be handled in various ways. In one example, ones of cached bloom filters 312 can be retrieved from a stored or archived state during a startup process of database service 310. In some examples, bloom filters 312 are then cached/stored in a RAM or volatile memory of one or more computing systems that comprise database service 310. Bloom filters 312 can be backed-up or archived in one or more non-volatile store systems, such as indicated for archived bloom filters 313. These archived bloom filters can be used to increase responsiveness of associated databases during startup processes, such as after power-on events, upon instantiation of virtual machines that house elements of database 330 or database service 310, or upon other triggers, such as corruption or loss of bloom filters cached locally to database service 310. Archived bloom filters 313 can be stored in one or more data storage elements, which can comprise elements of distributed data system 340.

During operation, bloom filters 312 can be augmented, altered, or otherwise modified responsive to new data entered into the associated databases, such as responsive to data write operations 303 in FIG. 3. The hashing functions and other operations to add keys into bloom filters 312 can be applied in operation 304. Once cached bloom filters 312 have been changed with respect to associated ones of archived bloom filters 313, then deltas or incremental backups to cached bloom filters 312 can be applied to the associated ones of archived bloom filters 313. In some examples, archived bloom filters are not employed, and cached bloom filters 312 can be built on-the-fly responsive to data writes into the database. In this non-archived example, initialization of the bloom filters can occur as data writes occur, as well as by processing each partition of the database or database 330 as a whole to determine which keys are present and absent using the hashing functions and other bloom filter creation processes. However, this process can take a time period longer than desired for larger databases, and thus archived/cached bloom filters might instead be employed as discussed above.

The bloom filters employed in FIG. 3 can also include various subdivisions or subsets that can be applied according to one or more associated criteria. For example, key lookup requests can indicate, or be determined to be associated with, various properties that are used as criteria to select a particular bloom filter. These properties can include an account identifier, a user identifier, a data partition identifier, a database identifier, or other identifiers, including combinations thereof. Database service 310 can receive these identifiers along with associated key lookup requests (or determine the identifiers according to properties associated with the requests). Subdivisions or entirely separate bloom filters can be included in cached bloom filters 312, such as per account bloom filters, per user bloom filters, per partition bloom filters, per database bloom filter, or others. Upon receiving the lookup requests, database service 310 can employ the appropriate bloom filter to determine presence or absence of the keys in the associated database.

NoSQL database 330 comprises a distributed database or data store that includes or more partitions 331-333. These partitions include user data and can comprise various views, data subsets, or tables, among other data structures that support the distributed nature of database 330. In many examples, database 330 includes various user data organized or referenced by corresponding data keys. Example keys are shown in FIG. 3 for database 330, with target key 339 highlighted for operations discussed below. In addition, each partition can have a corresponding partition bloom filter (335-337) that allows for further lookup optimization for individual partitions. For example, if a primary bloom filter, such as cached bloom filters 312, indicates potential presence of a target key in at least one of the partitions of database 330, then further discrimination among these partitions can be performed using associated secondary bloom filters 335-337 to determine presence of the target key among the partitions. Further operations of these secondary bloom filters are discussed below.

Distributed data system 340 is configured to deploy databases over a plurality of data centers, such as data centers 341-343. Typically, data centers 341-343 are distributed geographically with respect to each other, and this distribution can include this geographic distribution among other physical distributions, logical distributions, or other configurations. In many examples, distributed data system 340 comprise a cloud computing platform or cloud computing service, such as Microsoft® Azure, which may include one or more virtualized elements. Each of data centers 341-343 can have portions of database 330 stored therein, in associated storage elements, such as data storage systems controlled by associated computing systems. In FIG. 3, data center 341 stores portions 331-332, data center 342 stores portions 332-333, and data center 343 stores portion 331. It should be understood that each data center can store other portions that shown in FIG. 3, including all or less that all of the portions of database 330.

Turning now to further example operations of the elements of FIG. 3, one or more target keys 301 can be received by API 311. These target keys can be included in associated key lookup requests issued by external entities to API 311, such as by user systems 305. The key lookup requests typically request indications on whether data keys are present or absent from the associated database. These data keys identify data elements or user data that might be present in the database, and can be used to check if new data entries need to be made, if data entries have been removed, or for other purposes. However, key lookup processes without a bloom filter, as employed in FIG. 3, require cumbersome checking or searching of each database or database partition for the associated keys, which typically includes disk access and computing resources local to the data storage element or data center that houses the database or database partition. However, bloom filters 312 are employed in FIG. 3 to enhance at least key lookup processes as well as speed up general usage and responsiveness of the associated database, and lessen disk access or computing resources required at each associated distributed data center.

Responsive to receiving the key lookup requests, database service 310 processes the keys indicated in the lookup requests against one or more bloom filters 312. Key lookup process 380 is shown in FIG. 3 as an exemplary process that employs a bloom filter. Bloom filter 312a includes an array into which data keys of the database are hashed using one or more hashing functions. The outputs of the one or more hashing functions are indicated as elements in the array. When keys lookups are desired, the target keys can have the one or more hashing functions applied and the associated outputs compared to the array. Absence of the target keys in the database can be definitively indicated by checking the target keys using the bloom filter, while presence of the target keys in the database can only be potentially indicated as present using the bloom filter. To confirm presence of the target keys in the database, further key lookup processes are employed. Example target key 339 is indicated as potentially present, while example target key 338 is indicated as absent. These indications can be transferred to the requesting entities, as indicated in operation 302.

If a more definitive presence indicator is desired for potentially present keys, then further lookup processes can proceed. For example, to confirm or deny presence of target key 339 in database 330, one or more subsequent lookup requests can be issued to individual partitions 331-333 of database 330. Database service 310 can issue one or more lookups, such as lookups 360-362, for processing against partitions 331-333 of database 330. These lookups can comprise individual data or key queries that are handled locally to each data center that holds an associated partition. For example, lookup 360 can be issued to check for presence of key 339 in database partition 331, lookup 361 can be issued to check for presence of key 339 in partition 332, and lookup 362 can be issued to check for presence of key 339 in partition 333. Since each partition is distributed over one or more data centers, then these lookup operations might be handled by one or more affected data centers. In FIG. 3, key 339 is included in database partition 333, and thus a response indicate this positive presence can be issued to database service 310 which in turn transfers an indication to the associated requesting entity that confirms presence of key 339 in database 330.

As noted above, a primary-secondary bloom filter structure can be employed by system 300. Bloom filters 312 can be employed to quickly determine a presence status of target keys within database 330. If the presence status indicates absence of the target keys, then API 311 can indicate this status quickly and without further processing of database 330. If the presence status indicates potential presence of the target keys, then API 311 might indicate this potential presence as the presence status. However, if a further confirmation of the presence or absence of the target keys indicated as potentially present is desired, then further operations can be performed. Specifically, secondary bloom filters 335-337 can be employed for each data partition 331-333 to discriminate among the partitions and prevent unnecessary lookup processing of partitions that do not contain the target keys. Since secondary bloom filters 335-337 can indicate absence of the target keys within the associated partitions, then no further processing of the lookup requests for that partition is necessary. However, if potential presence is indicated by the associated one of secondary bloom filters 335-337, then the affected partition can have further lookup processing performed thereon.

Advantageously, enhanced database handling is achieved with the elements and examples discussed herein. Technical effects include lowering processing overhead, disk access, computing resources, and power consumption of data centers that house one or more databases. The bloom filters discussed herein can be used to quickly assess potential presence or absence of target data keys from partitions of a database to provide faster responses to key lookup requests as well as reduce processing burden of hosting the associated database. The two-tier or primary/secondary bloom filter structure discussed in FIG. 3 can provide further technical effects of streamlining key lookups among partitions to prevent unnecessary disk access or computing resources of potentially present target keys, especially when the database is spread over more than one data center distributed with respect to other data centers, such as in cloud computing platforms or cloud storage platforms. Moreover, bloom filters can be archived and subsequently loaded into a cached configuration to provide backups, faster power-down/up functionality, and delta configurations of the bloom filters, among other enhanced functionality.

Figure 4:
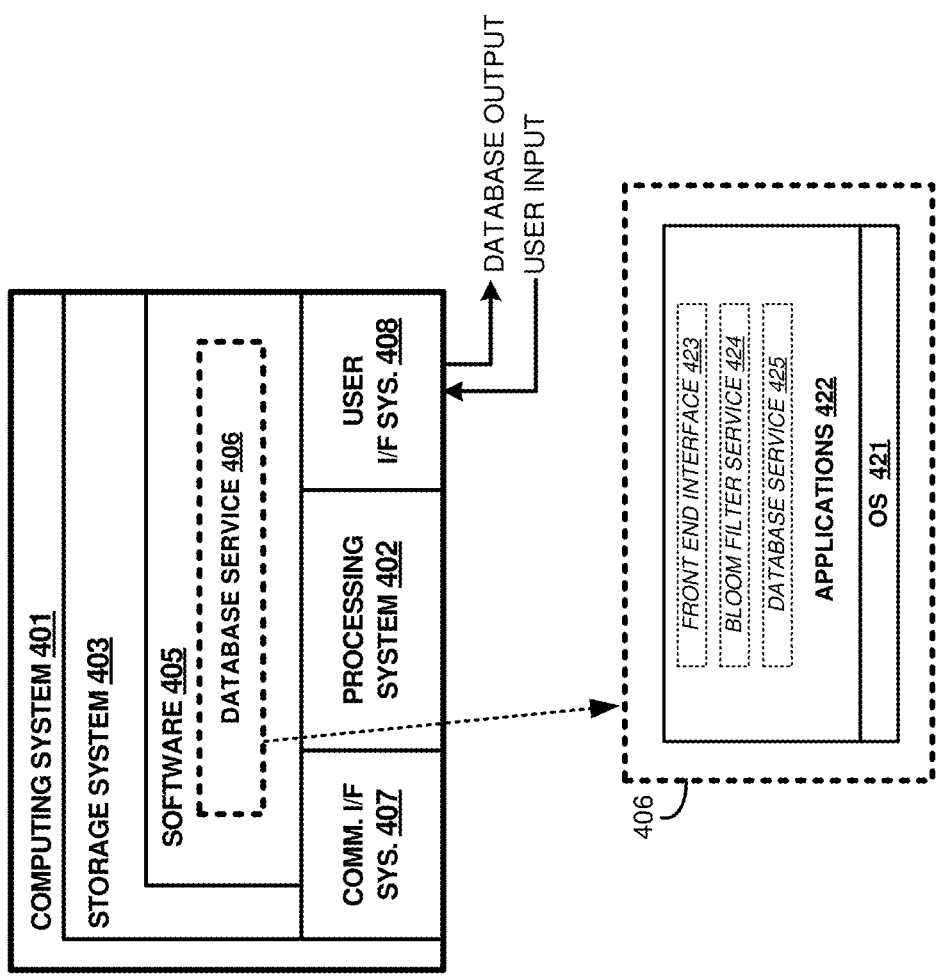
FIG. 4 illustrates a computing system suitable for implementing any of the architectures, processes, and operational scenarios disclosed herein.

FIG. 4 illustrates computing system 401 that is representative of any system or collection of systems in which the various operational architectures, scenarios, and processes disclosed herein may be implemented. For example, computing system 401 can be used to implement any of the elements of FIG. 1, such as database service 110 or database platform 111 of FIG. 1, database service 310 of FIG. 3 or any of the database systems of FIG. 3.

Examples implemented by computing system 401 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 401 are implemented on user devices, example devices include smartphones, laptop computers, tablet computers, desktop computers, gaming systems, entertainment systems, and the like.

Computing system 401 may be implemented as a single apparatus, system, or device or may be implemented in a distributed manner as multiple apparatuses, systems, or devices. Computing system 401 includes, but is not limited to, processing system 402, storage system 403, software 405, communication interface system 407, and user interface system 408. Processing system 402 is operatively coupled with storage system 403, communication interface system 407, and user interface system 408.

Processing system 402 loads and executes software 405 from storage system 403. Software 405 includes database service 406, which is representative of the processes, services, and platforms discussed with respect to the preceding Figures. When executed by processing system 402 to provide enhanced database services, including front-end bloom filter functionality for distributed databases, among other services, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise a micro-processor and processing circuitry that retrieves and executes software 405 from storage system 403. Processing system 402 may be implemented within a single processing device, but may also be distributed across multiple processing devices or sub-systems that cooperate in executing program instructions. Examples of processing system 402 include general purpose central processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device, but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing enhanced database services, including front-end bloom filter functionality for distributed databases, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software or other application software, in addition to or that include database service 406. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to provide enhanced database services, including front-end bloom filter functionality for distributed databases, among other services. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Database service 406 includes one or more software elements, such as OS 421 and applications 422. Applications 422 can receive user input, such as user input comprising database queries, or key lookup requests, among other user input. Applications 422 can include front end interface 423, bloom filter service 424, and distributed database service 425, or other services which can provide enhanced database services. These elements can describe various portions of computing system 401 with which a user interacts. For example, OS 421 can provide a software platform on which applications 422 are executed.

Front end interface 423 provides user-facing interface elements and can send and receive user interface data related to user interaction with computing system 401. For example, front end interface 423 can comprise one or more APIs or other interfaces for receiving database queries, data key lookup requests, or other database and data store interaction modes and elements. Bloom filter service 424 establishes and maintains one or more bloom filters for use in appraising incoming key lookup requests to determine absence or potential presence of data keys in associated data stores or databases. In some examples, bloom filter service 424 can read archived bloom filter information into a cached configuration local to front end interface 423, and establish changes or deltas to the archived or cached bloom filters. Database service 425 can interface with one or more data centers or storage elements that hold or service one or more distributed databases or distributed data stores. Database service 425 can include network interface elements, load balancing elements, and other elements that read databases or portions thereof, issue key lookup requests that pass through bloom filter service 424, and issue data queries received by front end interface 423, among other elements.

Communication interface system 407 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 408 can receive input and provide output over a network interface, such as communication interface system 407. In network examples, user interface system 408 might include web interfaces and terminal interfaces. User interface system 408 can packetize display or graphics data for remote display by a display system or computing system coupled over one or more network interfaces or web interfaces. Physical or logical elements of user interface system 408 can provide alerts or visual outputs to users or other operators. User interface system 408 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface. In further examples, user interface system 408 may include a touchscreen, keyboard, mouse, voice input device, audio input device, or other touch input device for receiving input from a user. Output devices such as a display, speakers, web interfaces, terminal interfaces, and other types of output devices may also be included in user interface system 408.

Communication between computing system 401 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A computing apparatus comprising one or more computer readable storage media, a processing system operatively coupled with the one or more computer readable storage media, and program instructions stored on the one or more computer readable storage media. When executed by the processing system, the program instructions direct the processing system to at least provide an interface to a database service that hosts at least a data store across a plurality of storage elements distributed with respect to each other, and receive, in the interface, lookup requests to determine if first keys indicated by the lookup requests are present in the data store. The program instructions further direct the processing system to process the lookup requests with at least a bloom filter initialized with second keys associated with the data store to determine presence statuses of the first keys with respect to the data store, and indicate the presence statuses responsive to the lookup requests.

Example 2

The computing apparatus of Example 1, comprising further program instructions, when executed by the processing system, direct the processing system to at least, based at least on the presence statuses indicating absence of ones of the first keys in the data store, indicate the absence of the ones of the first keys in the data store as the presence statuses responsive to associated ones of the lookup requests, and based at least on the presence status indicating potential presence of the ones of the first keys in the data store, further perform a query process on the data store to determine confirmed presence statuses of the ones of the first keys in the data store, and indicate the confirmed presence statuses as the presence statuses responsive to associated ones of the lookup requests.

Example 3

The computing apparatus of Examples 1-2, comprising further program instructions, when executed by the processing system, direct the processing system to at least process the lookup requests with the bloom filter without issuing lookup requests to the plurality of storage elements.

Example 4

The computing apparatus of Examples 1-3, comprising further program instructions, when executed by the processing system, direct the processing system to at least initialize the bloom filter with the second keys responsive to data write events into the data store for data associated with the second keys.

Example 5

The computing apparatus of Examples 1-4, comprising further program instructions, when executed by the processing system, direct the processing system to at least initialize the bloom filter with the second keys responsive to a startup event of the data store across the plurality of storage elements.

Example 6

The computing apparatus of Examples 1-5, comprising further program instructions, when executed by the processing system, direct the processing system to at least initialize the second keys into the bloom filter using an archived version of the bloom filter placed into a cached configuration with respect to the interface to the database service.

Example 7

The computing apparatus of Examples 1-6, comprising further program instructions, when executed by the processing system, direct the processing system to at least initialize further keys into the cached configuration of the bloom filter responsive to data write events into the data store for data associated with the further keys, the further keys initialized into the cached configuration of the bloom filter to establish a delta to the archived version of the bloom filter.

Example 8

The computing apparatus of Examples 1, comprising further program instructions, when executed by the processing system, direct the processing system to at least select the bloom filter among a set of bloom filters each designated to service ones of the lookup requests for an associated subdivision of the data store, the bloom filter selected from among the set of bloom filters by at least processing properties of the lookup requests to determine subdivisions associated with the lookup requests.

Example 9

A method of operating a distributed database system, the method comprising providing an interface to a database service that hosts at least a data store across a plurality of storage elements distributed with respect to each other, and receiving, in the interface, lookup requests to determine if first keys indicated by the lookup requests are present in the data store. The method includes processing the lookup requests with at least a bloom filter initialized with second keys associated with the data store to determine presence statuses of the first keys with respect to the data store, and indicating the presence statuses responsive to the lookup requests.

Example 10

The method of Example 9, further comprising, based at least on the presence statuses indicating absence of ones of the first keys in the data store, indicating the absence of the ones of the first keys in the data store as the presence statuses responsive to associated ones of the lookup requests, and based at least on the presence status indicating potential presence of the ones of the first keys in the data store, further performing a query process on the data store to determine confirmed presence statuses of the ones of the first keys in the data store and indicating the confirmed presence statuses as the presence statuses responsive to associated ones of the lookup requests.

Example 11

The method of Examples 9-10, further comprising processing the lookup requests with the bloom filter without issuing lookup requests to the plurality of storage elements.

Example 12

The method of Examples 9-11, further comprising initializing the bloom filter with the second keys responsive to data write events into the data store for data associated with the second keys.

Example 13

The method of Examples 9-12, further comprising initializing the bloom filter with the second keys responsive to a startup event of the data store across the plurality of storage elements.

Example 14

The method of Examples 9-13, further comprising initializing the second keys into the bloom filter using an archived version of the bloom filter placed into a cached configuration with respect to the interface to the database service.

Example 15

The method of Examples 9-14, further comprising initializing further keys into the cached configuration of the bloom filter responsive to data write events into the data store for data associated with the further keys, the further keys initialized into the cached configuration of the bloom filter to establish a delta to the archived version of the bloom filter.

Example 16

The method of Examples 9-15, further comprising selecting the bloom filter among a set of bloom filters each designated to service ones of the lookup requests for an associated subdivision of the data store, the bloom filter selected from among the set of bloom filters by at least processing properties of the lookup requests to determine subdivisions associated with the lookup requests.

Example 17

A computing apparatus comprising one or more computer readable storage media, a processing system operatively coupled with the one or more computer readable storage media, and program instructions stored on the one or more computer readable storage media. When executed by the processing system, the program instructions direct the processing system to at least provide an interface to a database service that distributes one or more databases over a plurality of data centers, the interface configured to receive requests for key lookups among the one or more databases. The program instructions further direct the processing system to, responsive to the requests for key lookups, deploy at least one bloom filter cached locally to the interface to determine if data keys indicated by the requests for key lookups are present in the one or more databases distributed over the plurality of data centers, and indicate presence statuses responsive to the requests for key lookups indicating states of the data keys with respect to the one or more databases.

Example 18

The computing apparatus of Example 17, comprising further program instructions, when executed by the processing system, direct the processing system to at least, based at least on the states of the data keys indicating absences of the data keys in the one or more databases, indicate the absence of the data keys as the presence statuses responsive to associated ones of the requests for key lookups. The program instructions further direct the processing system to, based at least on the states of the data keys indicating potential presence of the data keys in the one or more databases, further perform a query process on the one or more databases to determine confirmed presence states of the data keys in the one or more databases, and indicate the confirmed presence states as the presence statuses responsive to associated ones of the requests for key lookups.

Example 19

The computing apparatus of Examples 17-18, comprising further program instructions, when executed by the processing system, direct the processing system to at least initialize the at least one bloom filter with current data keys responsive to a startup event of the one or more databases across the plurality of data centers, initialize the current data keys into the at least one bloom filter using an archived version of the at least one bloom filter placed into a cached configuration with respect to the interface to the database service, and initialize further keys into the cached configuration of the at least one bloom filter responsive to data write events into the one or more databases for data associated with the further keys, the further keys initialized into the cached configuration of the at least one bloom filter to establish a delta to the archived version of the at least one bloom filter.

Example 20

The computing apparatus of Examples 17-19, comprising further program instructions, when executed by the processing system, direct the processing system to at least select the at least one bloom filter among a set of bloom filters each designated to service ones of the requests for the key lookups for an associated subdivision of the one or more databases, the at least one bloom filter selected from among the set of bloom filters by at least processing properties of the requests for the key lookups to determine subdivisions associated with the requests for the key lookups.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A computing apparatus comprising:
one or more computer readable storage media;
a processing system operatively coupled with the one or more computer readable storage media; and
program instructions stored on the one or more computer readable storage media, that when executed by the processing system, direct the processing system to at least:
provide an interface to a database service that hosts at least a data store spanning a plurality of storage elements distributed with respect to each other;
receive, in the interface, lookup requests issued by requesting entities to determine if target keys indicated by the lookup requests are presently stored by the data store;
process the lookup requests with at least a first bloom filter to determine presence statuses comprising absence or potential presence of the target keys in the data store, wherein the first bloom filter is initialized by at least performing a hashing process on data stored into the data store;
based at least on determining the target keys are absent from the data store, indicate to the requesting entities the absence as the presence statuses responsive to the lookup requests; and
based at least on determining the target keys are potentially present in the data store, process the target keys with one or more second bloom filters corresponding individually to the plurality of storage elements to determine which one or more storage elements among the plurality of storage elements potentially store the target keys, issue one or more queries to the one or more storage elements to determine confirmed presence statuses of the target keys, and indicate the confirmed presences statuses to the requesting entities.

2. The computing apparatus of claim 1, comprising further program instructions, when executed by the processing system, direct the processing system to at least:
based at least on determining the one or more storage elements that potentially store the target keys, further perform a query process on the one or more storage elements to determine the confirmed presence statuses of the target keys being stored in the one or more storage elements, and indicate the confirmed presence statuses as the presence statuses responsive to the lookup requests.

3. The computing apparatus of claim 1, comprising further program instructions, when executed by the processing system, direct the processing system to at least:
process the lookup requests with the first bloom filter without issuing key lookup requests to the plurality of storage elements.

4. The computing apparatus of claim 1, comprising further program instructions, when executed by the processing system, direct the processing system to at least:
initialize at least the first bloom filter with the data responsive to data write events into the data store.

5. The computing apparatus of claim 1, comprising further program instructions, when executed by the processing system, direct the processing system to at least:
initialize at least the first bloom filter with the data responsive to a startup event of the data store across the plurality of storage elements.

6. The computing apparatus of claim 5, comprising further program instructions, when executed by the processing system, direct the processing system to at least:
initialize at least the first bloom filter using an archived version of the first bloom filter placed into a cached configuration with respect to the interface to the database service.

7. The computing apparatus of claim 6, comprising further program instructions, when executed by the processing system, direct the processing system to at least:
further initialize the cached configuration of the first bloom filter responsive to data write events into the data store to establish a delta to the archived version of the bloom filter.

8. The computing apparatus of claim 1, comprising further program instructions, when executed by the processing system, direct the processing system to at least:
select the first bloom filter among a set of bloom filters each designated to service ones of the lookup requests for an associated subdivision of the data store, the first bloom filter selected from among the set of bloom filters by at least processing properties of the lookup requests to determine subdivisions associated with the lookup requests.

9. A method of operating a distributed database system, the method comprising:
providing an interface to a database service that hosts at least a data store spanning a plurality of storage elements distributed with respect to each other;
receiving, in the interface, lookup requests issued by requesting entities to determine if target keys indicated by the lookup requests are presently stored by the data store;
processing the lookup requests with at least a first bloom filter to determine presence statuses comprising absence or potential presence of the target keys in the data store, wherein the bloom filter is initialized by at least performing a hashing process on data stored into the data store;
based at least on determining the target keys are absent from the data store, indicating to the requesting entities the absence as the presence statuses responsive to the lookup requests; and
based at least on determining the target keys are potentially present in the data store, processing the target keys with one or more second bloom filters corresponding individually to the plurality of storage elements to determine which one or more storage elements among the plurality of storage elements potentially store the target keys, issuing one or more queries to the one or more storage elements to determine confirmed presence statuses of the target keys, and indicating the confirmed presences statuses to the requesting entities.

10. The method of claim 9, further comprising:
based at least on determining the one or more storage elements, further performing a query process on the one or more storage elements to determine the confirmed presence statuses of the ones of the target keys in the one or more storage elements, and indicating the confirmed presence statuses as the presence statuses responsive to associated ones of the lookup requests.

11. The method of claim 9, further comprising:
processing the lookup requests with the first bloom filter without issuing lookup requests to the plurality of storage elements.

12. The method of claim 9, further comprising:
initializing the first bloom filter with the second keys responsive to data write events into the data store for data associated with the second keys.

13. The method of claim 9, further comprising:
initializing the first bloom filter responsive to a startup event of the data store across the plurality of storage elements.

14. The method of claim 13, further comprising:
initializing the first bloom filter using an archived version of the first bloom filter placed into a cached configuration with respect to the interface to the database service.

15. The method of claim 14, further comprising:
initializing further data into the cached configuration of the first bloom filter responsive to data write events into the data store for data associated with the further data, the further data initialized into the cached configuration of the first bloom filter to establish a delta to the archived version of the first bloom filter.

16. The method of claim 9, further comprising:
selecting the first bloom filter among a set of bloom filters each designated to service ones of the lookup requests for an associated subdivision of the data store, the first bloom filter selected from among the set of bloom filters by at least processing properties of the lookup requests to determine subdivisions associated with the lookup requests.

17. A computing apparatus comprising:
one or more computer readable storage media;
a processing system operatively coupled with the one or more computer readable storage media; and
program instructions stored on the one or more computer readable storage media, that when executed by the processing system, direct the processing system to at least:
provide an interface to a database service that distributes one or more databases over a plurality of data centers, the interface configured to receive requests issued by requesting entities for key lookups among the one or more databases;

responsive to the requests for key lookups, employ at least one primary bloom filter cached locally to the interface to determine if data keys indicated by the requests for key lookups are potentially present in or absent from the one or more databases distributed over the plurality of data centers, wherein the at least one primary bloom filter is initialized using current data keys corresponding to data presently stored in the one or more databases;

based at least on determining the data keys are absent from the one or more databases, indicate to the requesting entities presence statuses responsive to the requests for key lookups indicating absences of the data keys with respect to the one or more databases; and based at least on determining the data keys are potentially present in the one or more databases, process the data keys with one or more secondary bloom filters corresponding individually to the plurality of data centers to determine which one or more data centers among the plurality of data centers potentially store the data keys, issue one or more queries to the one or more data centers to determine confirmed presence statuses of the data keys, and indicate the confirmed presences statuses to the requesting entities.

18. The computing apparatus of claim 17, comprising further program instructions, when executed by the processing system, direct the processing system to at least:

based at least on determining the data keys are potentially present in the one or more data centers, further perform a query process on the one or more data centers to determine the confirmed presence states of the data keys in the one or more data centers, and indicate the confirmed presence states as the presence statuses responsive to associated ones of the requests for key lookups.

19. The computing apparatus of claim 17, comprising further program instructions, when executed by the processing system, direct the processing system to at least:

initialize the at least one primary bloom filter with the current data keys responsive to a startup event of the one or more databases across the plurality of data centers;

initialize the current data keys into the at least one primary bloom filter using an archived version of the at least one primary bloom filter placed into a cached configuration with respect to the interface to the database service; and initialize further keys into the cached configuration of the at least one primary bloom filter responsive to data write events into the one or more databases for data associated with the further keys, the further keys initialized into the cached configuration of the at least one primary bloom filter to establish a delta to the archived version of the at least one primary bloom filter.

20. The computing apparatus of claim 17, comprising further program instructions, when executed by the processing system, direct the processing system to at least:

select the at least one primary bloom filter among a set of bloom filters each designated to service ones of the requests for the key lookups for an associated subdivision of the one or more databases, the at least one primary bloom filter selected from among the set of bloom filters by at least processing properties of the requests for the key lookups to determine subdivisions associated with the requests for the key lookups.

\* \* \* \* \*